(12) United States Patent
Cheng et al.

(10) Patent No.: US 9,461,850 B2
(45) Date of Patent: Oct. 4, 2016

(54) PARALLEL DATA PROCESSING

(71) Applicant: GLOBALFOUNDRIES INC., Grand Cayman (KY)

(72) Inventors: Xinhao Cheng, Shanghai (CN); Yonghua Lin, Beijing (CN); Chao Xue, Beijing (CN); Rong Yan, Beijing (CN); Chao Zhu, Beijing (CN)

(73) Assignee: GLOBALFOUNDRIES INC., Grand Cayman (KY)

( * ) Notice: Subject to any disclaimer, the term of this patent is extended or adjusted under 35 U.S.C. 154(b) by 0 days.

(21) Appl. No.: 14/257,236

(22) Filed: Apr. 21, 2014

(65) Prior Publication Data

US 2014/0321582 A1 Oct. 30, 2014

(30) Foreign Application Priority Data

Apr. 28, 2013 (CN) .......................... 2013 1 0155820

(51) Int. Cl.
*H04B 1/00* (2006.01)
*G06F 17/50* (2006.01)
(Continued)

(52) U.S. Cl.
CPC ......... *H04L 25/0204* (2013.01); *H04B 1/0003* (2013.01); *H04L 25/0224* (2013.01); *H04L 25/03159* (2013.01); *H04L 25/03821* (2013.01); *H04L 2027/003* (2013.01)

(58) Field of Classification Search
CPC ............. H04L 5/0048; H04L 27/2647; H04L 27/2613; H04L 25/0242; H04L 1/0003; H04L 1/06
USPC .............................................. 375/130; 703/13
See application file for complete search history.

(56) References Cited

U.S. PATENT DOCUMENTS 7,096,402 B2 * 8/2006 Yano .................... H03M 13/29
714/755

7,283,838 B2 10/2007 Lu
(Continued)

FOREIGN PATENT DOCUMENTS

EP 2525623 A2 11/2012

OTHER PUBLICATIONS

Zhu et al., Virtual Base Station Pool: Towards A Wireless Network Cloud for Radio Access Networks, IBM Research, Computing Frontiers, pp. 34, 2011.
(Continued)

*Primary Examiner* — Daniel Washburn
*Assistant Examiner* — Sarah Hassan
(74) *Attorney, Agent, or Firm* — Scully Scott Murphy and Presser

(57) ABSTRACT

Various embodiments of the present invention provide a method and apparatus for parallel data processing. In one embodiment of the present invention, there is provided a method for parallel data processing, comprising: receiving baseband data corresponding to multiple antennas from uplink data; converting the baseband data from time-domain signals to frequency-domain signals; processing the frequency-domain signals at least partially in parallel by multiple processing units in a general-purpose processor so as to restore transmitted code blocks; and constructing transmission block (TB) based on the transmitted code blocks. In one embodiment of the present invention, there is provided an apparatus for parallel data processing. By means of the method and apparatus of the present invention, the parallel data processing capacity of a general-purpose data processor may be used to process, in parallel as much as possible, data in uplink data transmission and further improve the receiver operation efficiency.

12 Claims, 7 Drawing Sheets

(51) Int. Cl.
  *H04L 25/02* (2006.01)
  *H04L 25/03* (2006.01)
  *H04L 27/00* (2006.01)

(56) References Cited

U.S. PATENT DOCUMENTS

| | | | |
|---|---|---|---|
| 7,434,145 B2 * | 10/2008 | Jin | H03M 13/29 |
| | | | 375/340 |
| 7,784,028 B2 | 8/2010 | Luo et al. | |
| 2002/0031166 A1 * | 3/2002 | Subramanian | H04B 1/0003 |
| | | | 375/130 |
| 2003/0004697 A1 * | 1/2003 | Ferris | G06F 17/5022 |
| | | | 703/13 |
| 2004/0196780 A1 * | 10/2004 | Chin | H04B 7/2628 |
| | | | 370/208 |
| 2005/0100102 A1 * | 5/2005 | Gazdzinski | H04B 1/7163 |
| | | | 375/242 |
| 2006/0234628 A1 * | 10/2006 | Horiguchi et al. | 455/39 |
| 2008/0123781 A1 * | 5/2008 | Pisek | H03M 13/2969 |
| | | | 375/340 |
| 2009/0225889 A1 * | 9/2009 | Tsai et al. | 375/267 |
| 2010/0303096 A1 | 12/2010 | Kasher | |
| 2011/0039503 A1 | 2/2011 | Hu | |
| 2012/0243645 A1 | 9/2012 | Bougard | |

OTHER PUBLICATIONS

Salmela et al., 3G Long Term Evolution Baseband Processing with Application-Specific Processors, International Journal of Digital Multimedia Broadcasting, vol. 2009, 13 pgs.

* cited by examiner

PARALLEL DATA PROCESSING

CROSS-REFERENCE TO RELATED APPLICATION

This application claims priority under 35 U.S.C. §119 from Chinese Patent Application No. 201310155820.3 filed Apr. 28, 2013, the entire contents of which are incorporated herein by reference.

BACKGROUND OF THE INVENTION

1. Field of the Invention

Various embodiments of the present invention relate to data processing, and more specifically, to a method and apparatus for parallel data processing in uplink data transmission.

2. Description of Related Art

With the development of wireless communication technology, considerable progress has been achieved in both hardware and software in a communication system. As a result, a wireless communication network can provide increasingly high transmission bandwidths, and transmission delays in the wireless communication network are reduced greatly. Technological advances bring about many conveniences to massive users and can support various applications in a mobile terminal. With respect to a mobile terminal, as its data processing capacity grows stronger, requirements on real time transmission of data by various application programs installed on the mobile terminal also tend to get higher. In the meanwhile, the number of mobile terminal users increases constantly. Therefore, high requirements are imposed on the data processing capacity of a wireless network.

A device (e.g. a receiver, etc.) in an existing wireless communication network is usually implemented based on a dedicated hardware device, which may include, for example, a dedicated chip, an adaptor, an accelerator, etc; moreover, it is possible to involve a dedicated digital signal processing (DSP) circuit and/or a field programmable gate array (FPGA), etc. Although the receiver may further include software processing modules, since these software processing modules are developed based on dedicated hardware devices, they cannot use a parallel data processing algorithm supported by a general-purpose processor.

It should be understood that with the increase of a general-purpose computer hardware processing capacity, techniques such as a multi-core processor and a computer cluster provide strong physical support for parallel data processing, and the parallel data processing capacity based on general-purpose processors has been improved by a large margin. Regarding the wireless communication field, although dedicated hardware architectures in communication devices have made huge contribution to the data processing capacity improvement, they restrict to some extent the application of general-purpose parallel data processing algorithms. In view of the status quo and development trend, it becomes a whole new research area as to how to introduce into wireless communication devices a general-purpose data processor and further a general-purpose parallel data processing algorithm.

SUMMARY OF THE INVENTION

Therefore, it is desired to develop a more efficient technical solution of parallel data processing, and it is desired that the technical solution can combine with existing hardware in a wireless communication network and supplement and/or replace existing dedicated hardware circuits, software modules and combinations of hardware and software by using the parallel data processing capacity of a general-purpose processor (GPP).

In one embodiment of the present invention, there is provided a method for parallel data processing, including: receiving baseband data corresponding to multiple antennas from uplink data; converting the baseband data from time-domain signals to frequency-domain signals; processing the frequency-domain signals at least partially in parallel by multiple processing units in a general-purpose processor so as to restore transmitted code blocks (CB); and constructing transmission block (TB) based on the transmitted code blocks.

In one embodiment of the present invention, the processing the frequency-domain signals at least partially in parallel by multiple processing units in a general-purpose processor so as to restore transmitted code blocks includes: identifying the frequency-domain signals as data objects; and in a stage among multiple stages, processing the data objects at least partially in parallel so as to generate data objects used for a next stage, based on parallel groups corresponding to the stage and comprised in the data objects.

In one embodiment of the present invention, the processing the data objects at least partially in parallel so as to generate data objects used for a next stage based on parallel groups corresponding to the stage and comprised in the data objects includes: in response to having obtained multiple parallel groups corresponding to the stage, instructing one of the multiple processing units to process one of the multiple parallel groups so as to generate data objects used for a next stage.

In one embodiment of the present invention, there is provided an apparatus for parallel data processing, including: a receiving module configured to receive baseband data corresponding to multiple antennas in uplink data; a converting module configured to convert the baseband data from time-domain signals to frequency-domain signals; a processing module configured to process the frequency-domain signals at least partially in parallel by multiple processing units in a general-purpose processor so as to restore transmitted code blocks; and a constructing module configured to construct transmission block (TB) based on the transmitted code blocks.

In one embodiment of the present invention, the processing module includes: an identifying module configured to identify the frequency-domain signals as data objects; and a stage processing module configured to, in a stage among multiple stages, process the data objects at least partially in parallel so as to generate data objects used for a next stage, based on parallel groups corresponding to the stage and comprised in the data objects.

In one embodiment of the present invention, the stage processing module includes: an instructing module configured to, in response to having obtained multiple parallel groups corresponding to the stage, instruct one of the multiple processing units to process one of the multiple parallel groups so as to generate data objects used for a next stage.

By means of the technical solution as described by the embodiments of the present invention, there is proposed a method and apparatus for implementing "a virtual receiver." The technical solution, instead of completely relying on a dedicated hardware architecture, uses the parallel data processing capacity of an existing general-purpose processor (e.g. using multiple cores in a multi-core processor) to process, in parallel as much possible, data received via multiple antennas in uplink transmission. Therefore, on the one hand, the data processing efficiency may be improved; and on the other hand, huge overheads of manpower and material resources for designing and developing circuits such as application-specific DSP and FPGA may be reduced and even eliminated.

BRIEF DESCRIPTION OF THE DRAWINGS

Through the more detailed description of some embodiments of the present disclosure in the accompanying drawings, the above and other objects, features and advantages of the present disclosure will become more apparent, wherein the same reference generally refers to the same components in the embodiments of the present disclosure.

DETAILED DESCRIPTION OF THE PREFERRED EMBODIMENTS

Figure 1:
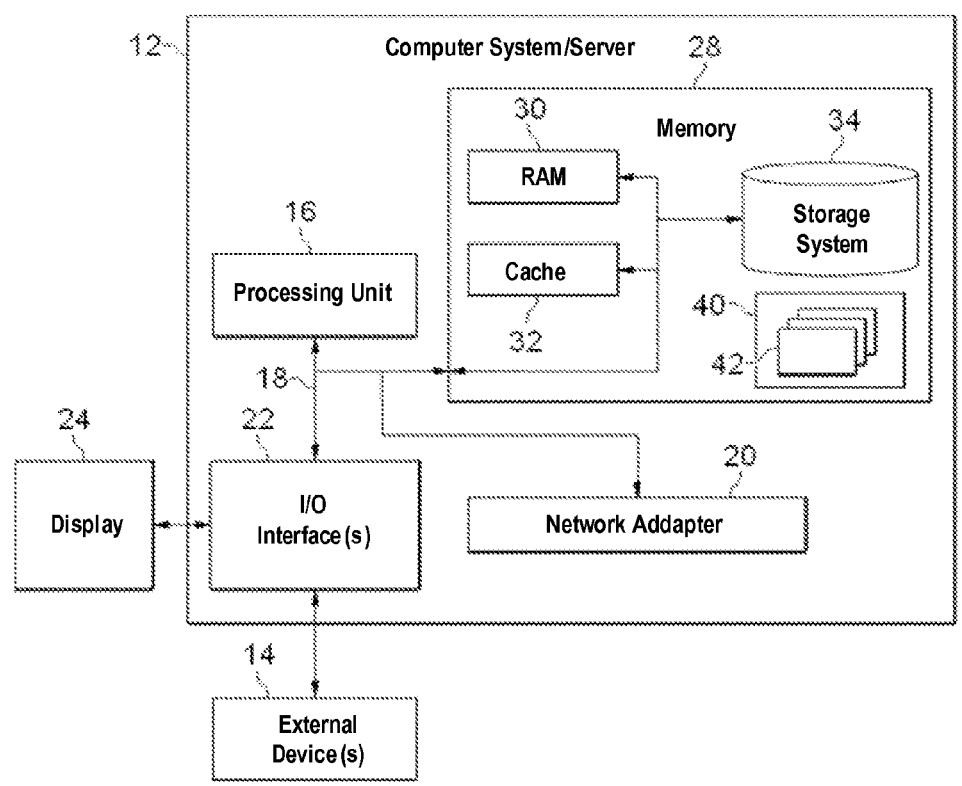
FIG. 1 schematically shows a block diagram of an exemplary computer system which is applicable to implement the embodiments of the present invention.

Some preferable embodiments will be described in more detail with reference to the accompanying drawings, in which the preferable embodiments of the present disclosure have been illustrated. However, the present disclosure can be implemented in various manners, and thus should not be construed to be limited to the embodiments disclosed herein. On the contrary, those embodiments are provided for the thorough and complete understanding of the present disclosure, and completely conveying the scope of the present disclosure to those skilled in the art.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, in some embodiments, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated data signal may take any of a variety of forms, including, but not limited to, an electromagnetic signal, optical signal, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instruction means which implements the function/act specified in the flowchart and/or block diagram block or blocks.

The computer program instructions may also be loaded onto a computer, other programmable data processing apparatus, or other devices to cause a series of operational steps to be performed on the computer, other programmable data processing apparatus or other devices to produce a computer implemented process such that the instructions which execute on the computer or other programmable apparatus provide processes for implementing the functions/acts specified in the flowchart and/or block diagram block or blocks.

Referring now to FIG. 1, in which a block diagram of an exemplary computer system/server 12 which is applicable to implement the embodiments of the present invention is shown. Computer system/server 12 shown in FIG. 1 is only illustrative and is not intended to suggest any limitation as to the scope of use or functionality of embodiments of the invention described herein.

As shown in FIG. 1, computer system/server 12 is shown in the form of a general-purpose computing device. The components of computer system/server 12 may include, but are not limited to, one or more processors or processing units 16, a system memory 28, and a bus 18 that couples various system components including system memory 28 and processing units 16.

Bus 18 represents one or more of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown in FIG. 1 and typically called a "hard drive"). Although not shown in FIG. 1, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the invention.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication can occur via Input/Output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples, include, but are not limited to: microcode, device drivers, redundant processing units, external disk drive arrays, RAID systems, tape drives, and data archival storage systems, etc.

Figure 2:
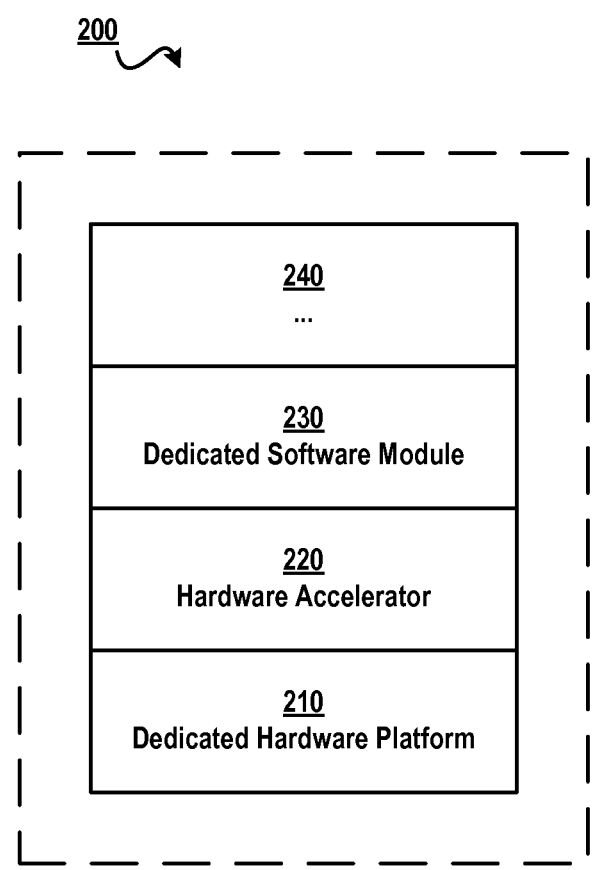
FIG. 2 schematically shows an architecture diagram of a receiver in uplink communication according to one solution.

How to implement a method and apparatus described in the present invention will be schematically illustrated below by only taking a receiver involved in uplink transmission as an example. FIG. 2 schematically shows an architecture diagram of a receiver 200 in uplink communication according to one solution. Note not all modules of a conventional receiver are shown in the receiver in FIG. 2, but a typical structure of a receiver is shown schematically. Receiver 200 may comprise: a dedicated hardware platform 210 that, for example, may include a rack, a chassis, a power supply, etc.; a dedicated hardware accelerator 220, and a dedicated software module 230 implemented based on the dedicated hardware platform 210 and dedicated hardware accelerator 220; or may further comprise other module 240. Receiver 220 should have high data throughput capacity and "real-time processing" capacity. For example, the time overhead for processing received signals should be at a magnitude order of 1 ms.

Figure 3:
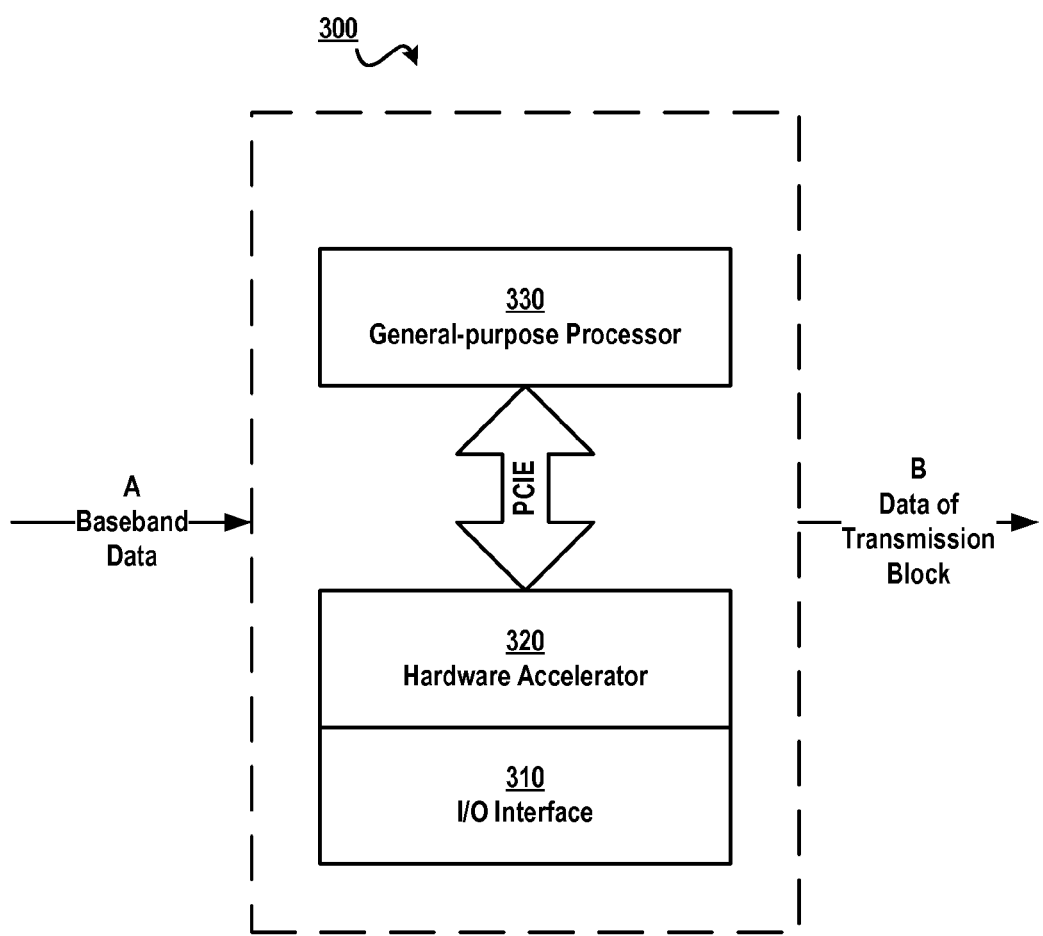
FIG. 3 schematically shows an architecture diagram of a receiver in uplink communication according to one embodiment of the present invention.

FIG. 3 schematically shows an architecture diagram 300 of a receiver in uplink communication according to one embodiment of the present invention. In this embodiment, there is proposed an architecture for parallel data processing in uplink data transmission. As shown in FIG. 3, there are comprised: an I/O interface 310 for communicating with an antenna system; a hardware accelerator 320 for processing data that are related to I/O data and/or that are computation-sensitive; and a general-purpose processor 330, which may, like a multi-core CPU in an ordinary computer, be used for processing data transmitted via a PCIE interface. In this embodiment, I/O interface 310 may, for example, receive baseband data (as shown by arrow A) corresponding to antennas and output data of transmission block (TB) (as shown by arrow B) for other data processing apparatus to process subsequently.

Based on the structure shown in FIG. 3, there may be provided a method for implementing parallel data processing based on a general-purpose processor. Specifically, in one embodiment of the present invention there may be provided a method for parallel data processing, comprising: receiving baseband data from multiple received antennas from uplink data; converting the baseband data from time-domain signals to frequency-domain signals; processing the frequency-domain signals at least partially in parallel by multiple processing units in a general-purpose processor so as to restore transmitted code blocks; and constructing transmission block (TB) based on the code blocks.

Figure 4:
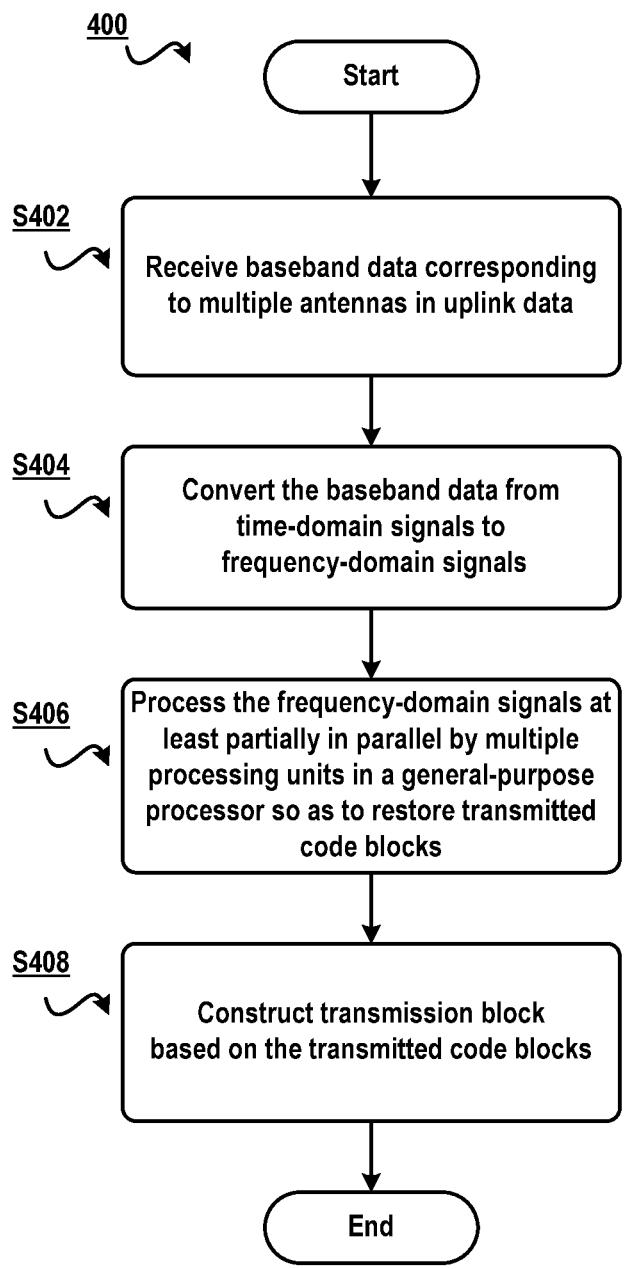
FIG. 4 schematically shows a flowchart of a method for parallel data processing according to one embodiment of the present invention.

FIG. 4 schematically shows a flowchart 400 of a method for parallel data processing according to one embodiment of the present invention. First of all, in step S402 baseband data corresponding to multiple antennas from uplink data are received. In this embodiment, I/O interface 310 as shown in FIG. 3 may be employed for implementation. In this step, data from multiple antennas may be radio-frequency signals, which are converted to baseband data through a remote radio head (RRH) and an RRH adaptor.

In step S404, the baseband data are converted from time-domain signals to frequency-domain signals. Specifically, a fast Fourier transform (FFT) algorithm may be used to convert time-domain signals to frequency-domain signals. Those skilled in the art may implement concrete conversion based on the design principle of the FFT algorithm, which is not detailed in this disclosure.

In step S406, the frequency-domain signals are processed at least partially in parallel by multiple processing units in a general-purpose processor, so as to restore transmitted code blocks. In this embodiment, the general-purpose processor may be, for example, a conventional central processing unit (CPU) in the computer field, and the CPU may comprise multiple processing units which may be, e.g. processor cores. An example of the general-purpose processor is, for example, a double-core, 4-core, or 8-core CPU. Only for the purpose of illustration, when a general-purpose processor with 4 processor cores is employed, the frequency-domain signals may be processed in parallel by the 4 processor cores.

Note although a multi-core CPU is used as an exemplary embodiment of the general-purpose processor, those skilled in the art should understand that other computer device may be selected based on a concrete implementation environment. For example, a physical machine and/or a virtual machine may be selected as the general-purpose processor, or a computer device such as a computer cluster may be employed, so long as the computer device is capable of parallel processing.

Based on the idea of parallel data processing, it is desired to divide to-be-processed signals into multiple groups that can be processed in parallel, and it is desired to use multiple processor cores to process in parallel the multiple groups without mutual interference, thereby increasing the data processing efficiency. Hereinafter, implementation details will be described in detail with reference to FIGS. 5 and 6.

In step S408, transmission block is constructed based on the transmitted code blocks. Through the parallel processing in step S406, code blocks indicative of transmission information at a transmitter may be obtained, and by decoding, checking and combining these code blocks, a transmission block with respect to each user may be obtained.

In one embodiment of the present invention, a step of correcting carrier frequency offset (CFO) and a step of removing a cyclic prefix may be further comprised in step S404. Specifically, in a long term evolution (LTE) system, a sub-carrier bandwidth may be 15 kHz; since frequency offset of a half carrier is introduced in uplink, CFO correction should be performed at the receiver so as to remove frequency offset. In addition, for an OFDM (orthogonal frequency division multiplexing)/SC-FDMA (single-carrier frequency division multiple access) system, a cyclic prefix functions to avoid inter-symbol interference (ISI), so relevant processing should be performed while executing OFDM demodulation.

In one embodiment of the present invention, for example, in case of multiple antennas (e.g. 8 antennas), data from the multiple antennas are relatively independent of each other, so multiple processor cores may be used to process in parallel data from the multiple antennas. For example, where the general-purpose processor comprises 4 processor cores, the 4 processor cores may be used to process in parallel data from 4 antennas. After the first round of processing ends, idle processor cores may be further used to process data from the remaining 4 antennas.

Note the processing time of each processor core may differ, and the number of processor cores might not match the number of antennas perfectly. Therefore, there may exist a situation where multiple processor cores do not implement processing completely in parallel all the time. In fact, processing times of various processor cores might overlap to some extent, but do not necessarily start and/or end at the same time. To ensure a subsequent operation is executed after completion of a processor core with the lowest processing speed, processing results from various processor cores may be written to a data buffer, and may further be synchronized using an additional operation (e.g. barrier operation).

Note although parallel processing may be achieved by using multiple processor cores to synchronously process data from multiple antennas, data outputted by the parallel processing stage might be no longer suitable to be grouped by antenna. Therefore, to implement parallel processing as much as possible, other grouping patterns may be resorted to, so as to use multiple processor cores to process in parallel data in various groups.

Based on the foregoing analysis, one embodiment of the present invention proposes a method for dividing a processing flow in uplink into multiple stages. Specifically, in this embodiment the processing the frequency-domain signals at least partially in parallel by multiple processing units in a general-purpose processor so as to restore transmitted code blocks comprises: identifying the frequency-domain signals as data objects; and in a stage among multiple stages, processing the data objects at least partially in parallel so as to generate data objects used for a next stage, based on parallel groups corresponding to the stage and comprised in the data objects.

In this manner, the entire operational flow that could not be processed in parallel may be divided into multiple stages executed in series, and in each stage, groups result from different dividing manners and further various groups are processed in parallel. Note in this embodiment, there may be different kinds of parallel groups in different stages. For example, in different stages, to-be-processed data may be divided into multiple parallel groups by antenna, symbol and code block.

In one embodiment of the present invention, the processing the data objects at least partially in parallel so as to generate data objects used for a next stage based on parallel groups corresponding to the stage and comprised in the data objects comprises: in response to having obtained multiple parallel groups corresponding to the stage, instructing one of the multiple processing units to process one of the multiple parallel groups so as to generate data objects used for a next stage.

In different stages, after parallel groups specific to the stage have been obtained (e.g. different groups have been obtained by dividing data from different antennas), one parallel group may be processed by one processing unit. In other words, where there are idle processing units (e.g. there are multiple processor cores in a general-purpose processor), multiple parallel groups may be processed in parallel by multiple processing units.

Figure 5:
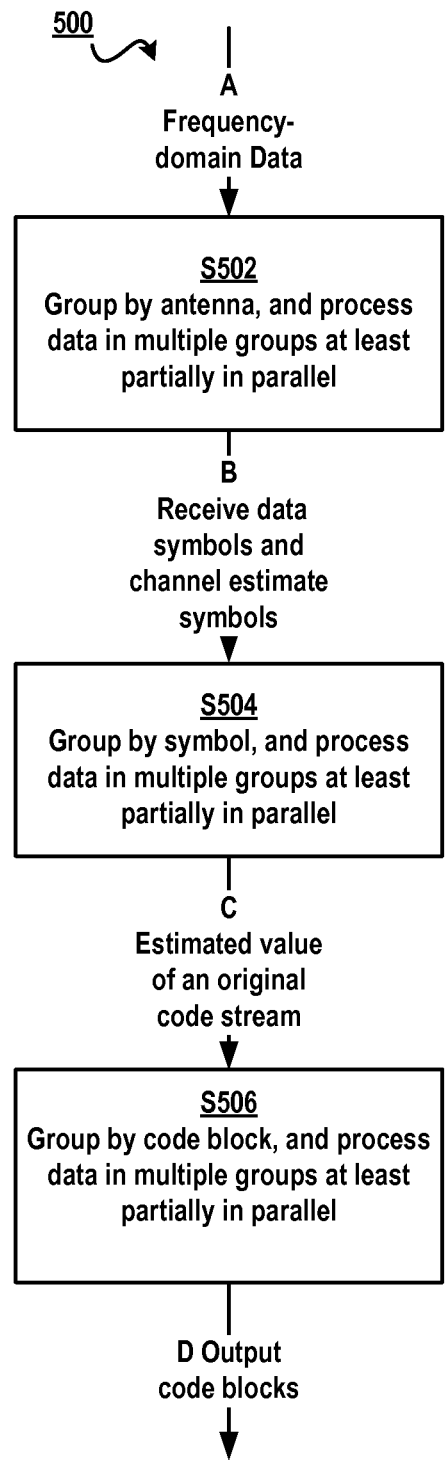
FIG. 5 schematically shows a flowchart of a method for parallel data processing in multiple stages according to one embodiment of the present invention.

With reference to steps S510-S530 in FIG. 5, detailed description is presented below to how to obtain multiple parallel groups corresponding to each stage and subsequently process them in parallel. FIG. 5 schematically shows a flowchart 500 of a method for parallel data processing in multiple stages according to one embodiment of the present invention. In step S502, data objects to be processed at this point are frequency-domain data (as shown by arrow A). Subsequently, the frequency-domain data may be divided into multiple groups by antenna, so that data in the multiple groups are processed at least partially in parallel by multiple processor cores.

As described above, data from multiple antennas are independent of each other, and there is no time dependence while processing data from various antennas. Therefore, if multiple processor cores process in parallel data from multiple antennas, the data processing efficiency can be increased, thereby helping to reduce the time delay. Subsequently, the output of step S502 may be received data symbols and channel estimation symbols (as shown by arrow B), and these symbols may serve as data objects to be processed in a next stage.

In step S504, data objects to be processed at this point are received data symbols and channel estimation symbols and may be grouped by symbol, and data in multiple groups may be processed at least partially in parallel. In this step, data in multiple groups may be processed by multiple processor cores at least partially in parallel according to a series of steps such as channel equation/multiple antennas combination, and further an estimated value of an original code stream is formed (as shown by arrow C). Next, the estimated value of the original code stream outputted by step S504 may be used as data objects for a next stage.

In step S506, code blocks may be extracted from the estimated value of the original code stream, and grouping is implemented according to code blocks; subsequently, data in multiple groups is processed at least partially in parallel. Data carried by various code blocks are independent of each other, so data in multiple code blocks may be processed in parallel and finally transmitted code blocks are restored.

By splitting the processing flow shown in step S406 in FIG. 4 into the three stages shown by steps S502, S504 and S506 in FIG. 5, it can be ensured that in each stage parallel processing is implemented using the computational capacity of multiple processor cores in a processor. Note although it takes some time to perform a synchronization operation such as barrier at the end of each step, parallel data processing can be implemented in most running times of steps S502, S504 and S06. Therefore, the data processing efficiency can be improved significantly.

Figure 6A:
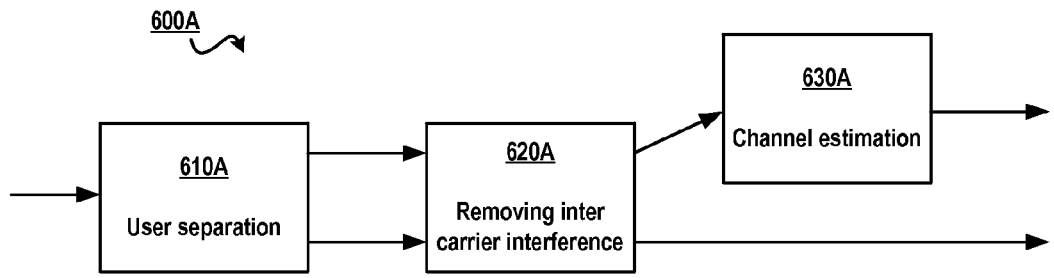
FIGS. 6A-6C respectively and schematically show flowcharts of concrete steps of a method for parallel processing in multiple stages.
Figure 6B:
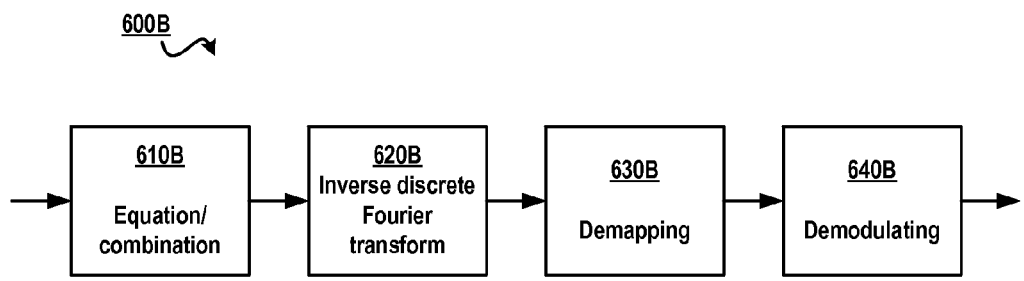
Figure 6C:
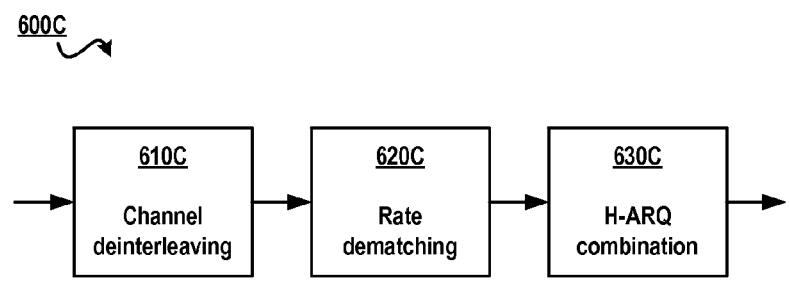

With reference to FIGS. 6A-6C, detailed description is presented below to concrete operations of step S502, S504 and S506 shown in FIG. 5. FIGS. 6A-6C respectively and schematically show flowcharts 600A-600C of concrete steps of a method for parallel processing in multiple stages.

Specifically, FIG. 6A schematically shows a flowchart 600A of concrete steps of a method for parallel processing in a first stage. In this embodiment, the instructing, in response to having obtained multiple parallel groups corresponding to the stage, one of the multiple processing units to process one of the multiple parallel groups so as to generate data objects used for a next stage comprises: in a first stage of the multiple processing stages, dividing the frequency-domain signals into multiple first parallel groups based on the multiple antennas corresponding to the frequency-domain signals; and at least partially in parallel obtaining multiple data carrier symbols and multiple channel estimation symbols from the multiple first parallel groups as data objects used for a second stage. In this embodiment, multiple processing units may process in parallel data from multiple antennas so as to obtain a desired result.

In one embodiment of the present invention, the at least partially in parallel obtaining multiple data carrier symbols and multiple channel estimation symbols from the multiple first parallel groups comprises: implementing user separation so as to obtain carrier symbols and reference signals from the multiple first parallel groups; removing inter carrier interference from the carrier symbols and the reference signals so as to form the data carrier symbols and offset-corrected reference symbols, respectively; and performing channel estimation on the offset-corrected reference symbols so as to form the multiple channel estimation symbols.

With reference to FIG. 6A detailed description is presented now to the concrete operational process. First of all, a user separation operation is performed in block 610A. In LTE, multiple users are distinguished based on resource blocks, and various resource blocks are separate in terms of frequency domain. Therefore, according to bandwidth resources allocated to users, corresponding data carrier signals and reference signals are extracted so as to process with respect to each user.

Later in block 620A, inter carrier interference is removed. The above-described carrier frequency offset might introduce inter carrier interference. For an OFDM system, to maintain the orthogonality between sub-carriers is of great significance to the performance of the communication system. In an actual communication system, however, since there might exist frequency offset between reference clocks of a transmitter and a receiver and Doppler frequency offset might be introduced from the movement of user equipment, residual carrier frequency offset might exist in received signals. Such carrier frequency offset might undermine the orthogonality between sub-carriers. By removing inter carrier interference, the receiver performance can be improved. Through this step, offset-corrected data carrier signals and offset-corrected reference symbols may be obtained.

In block 630A, channel estimation may be performed so as to obtain channel estimation symbols. Channel estimation may include various aspects, for example, performing channel estimation on offset-corrected reference symbols according to known reference signals, performing channel estimation in multi-antenna mode, and based on a result of channel estimation on offset-corrected reference symbols, estimating a result of channel estimation corresponding to offset-corrected data carrier symbols by using a signal processing algorithm.

Although FIG. 6A only schematically shows the flow of processing data from one antenna by using one processor core, those skilled in the art may understand that multiple processor cores may process in parallel data from multiple antennas so as to obtain multiple received data symbols and multiple channel estimation symbols.

FIG. 6B schematically shows a flowchart 600B of concrete steps of a method for parallel processing in a second stage. In this embodiment, the instructing, in response to having obtained multiple parallel groups corresponding to the stage, one of the multiple processing units to process one of the multiple parallel groups so as to generate data objects used for a next stage comprises: in a second stage of the multiple processing stages, performing channel equation and multiple antennas combination with respect to the multiple data carrier symbols and the multiple channel estimation symbols so as to form multiple effective frequency-domain symbols as multiple second parallel groups; and at least partially in parallel obtaining an estimated value of an original code stream from the multiple effective frequency-domain symbols as data objects used for a third stage. In this embodiment, multiple processing units may process in parallel multiple second parallel groups so as to obtain a desired result.

In one embodiment of the present invention, the at least partially in parallel obtaining an estimated value of an original code stream from the multiple effective frequency-domain symbols comprises: converting the multiple effective frequency-domain symbols to time-domain signals; and performing Constellation demodulation with respect to the time-domain signals so as to obtain an estimated value of an original code stream.

Specifically, with reference to FIG. 6B, first channel equation and multiple antennas combination are performed in block 610B. Channel equation refers to compensating for channel characteristics, and multiple antennas combination refers to weighting and combining signals to be obtained from multiple antennas. They both aim to improve the performance in wireless transmission.

Next in block 620B, an inverse discrete Fourier transform IDFT is performed so as to convert frequency-domain signals to time-domain signals.

In block 630B, layer demapping is performed so as to restore a mapping relationship between a layer and a data stream. This step is active only when the system defines users adopt multiple input multiple output (MIMO) technology.

Finally in block 640B, quadrature amplitude modulation (QAM) demodulation is performed. Here soft demodulation technology may be used so as to restore a mapping relationship between a constellation symbol and binary information. The output of this step is an estimated value of an original code stream.

Note although FIG. 6B only schematically shows the flow of processing, by using one processor core, one parallel group resulted from division according to symbol, those skilled in the art may understand that multiple processor cores may process in parallel data from multiple parallel groups so as to obtain an estimated value of an original code stream.

FIG. 6C schematically shows a flowchart 600C of concrete steps of a method for parallel processing in a third stage. In this embodiment, the instructing, in response to having obtained multiple parallel groups corresponding to the stage, one of the multiple processing units to process one of the multiple parallel groups so as to generate data objects used for a next stage comprises: in a third stage of the multiple processing stages, extracting multiple code blocks from the estimated value of the original code stream as multiple third parallel groups; and at least partially in parallel restoring transmitted code blocks from the multiple code blocks. In this embodiment, multiple processing units may process in parallel multiple third parallel groups so as to obtain a desired result.

In this embodiment, since each code block's mapping information in the estimated value of the original code stream has been learned at the receiver, multiple code blocks may be extracted according to the mapping information. In subsequent steps, the multiple code blocks may be processed in parallel so as to improve the data processing efficiency. In one embodiment of the present invention, the at least partially in parallel restoring transmitted code blocks from the multiple code blocks comprises: performing channel deinterleaving, rate dematching and hybrid repeat mode combination with respect to the multiple code blocks so as to restore transmitted code blocks.

Specifically, with reference to FIG. 6C, in blocks 610C, 620C and 630C channel deinterleaving, rate dematching and H-ARQ (hybrid automatic repeat request) combination may be performed with respect to the code blocks. These steps have the same meaning as the prior art and thus are not detailed here.

Note although FIG. 6C only schematically shows the flow of processing by using one processor core one parallel group that results from division by code block, those skilled in the art may understand that multiple processor cores may process in parallel data from multiple parallel groups so as to restore transmitted code blocks.

In one embodiment of the present invention, the constructing transmission block (TB) based on the transmitted code blocks comprises: decoding the transmitted code blocks based on a decoding algorithm; and combining the decoded code blocks so as to form the transmission block.

In practical implementation, decoding may be implemented using a Turbo decoding method so as to generate decoded code blocks. Afterwards, cyclic redundancy check (CRC) may be performed on the decoded code blocks so as to verify whether the code blocks are transmitted correctly or not. After combining the decoded code blocks into the transmission block, CRC check may be performed on the transmission block so as to verify whether the transmission block is transmitted correctly or not. Since each transmission block is composed of one or more code blocks, after performing CRC check on each code block, CRC check is performed on the transmission block, so it may be verified whether data in the entire transmission block are transmitted correctly or not.

By means of the method described above, multiple cores in the multi-core processor may be applied to process, in parallel as much as possible, received data in uplink data transmission. In this manner, the receiver processing efficiency may be improved, and overheads for developing dedicated hardware and/or software reduced.

Figure 7:
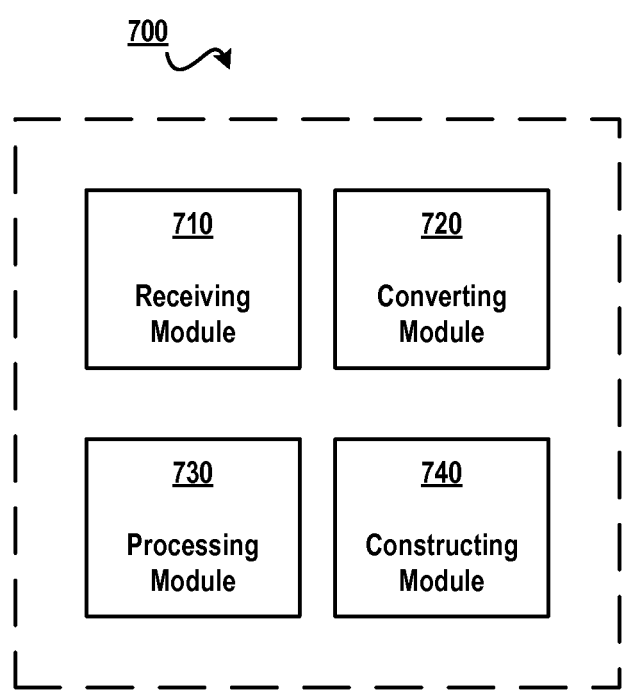
FIG. 7 schematically shows a block diagram of an apparatus for parallel data processing according to one embodiment of the present invention.

FIG. 7 schematically shows a block diagram 700 of an apparatus for parallel data processing according to one embodiment of the present invention. FIG. 7 shows an apparatus for parallel data processing, comprising: a receiving module 710 configured to receive baseband data corresponding to multiple antennas from uplink data; a converting module 720 configured to convert the baseband data from time-domain signals to frequency-domain signals; a processing module 730 configured to process the frequency-domain signals at least partially in parallel by multiple processing units in a general-purpose processor so as to restore transmitted code blocks; and a constructing module 740 configured to construct transmission block (TB) based on the transmitted code blocks.

In one embodiment of the present invention, the processing module 730 comprises: an identifying module configured to identify the frequency-domain signals as data objects; and a stage processing module configured to, in a stage among multiple stages, process the data objects at least partially in parallel so as to generate data objects used for a next stage, based on parallel groups corresponding to the stage and comprised in the data object.

In one embodiment of the present invention, the stage processing module comprises: an instructing module configured to, in response to having obtained multiple parallel groups corresponding to the stage, instruct one of the multiple processing units to process one of the multiple parallel groups so as to generate data objects used for a next stage.

In one embodiment of the present invention, the instructing module comprises: a first grouping module configured to, in a first stage of the multiple processing stages, divide the frequency-domain signals into multiple first parallel groups based on the multiple antennas corresponding to the frequency-domain signals; and a first processing module configured to at least partially in parallel obtain multiple data carrier symbols and multiple channel estimation symbols from the multiple first parallel groups as data objects used for a second stage.

In one embodiment of the present invention, the first processing module comprises: a separating module configured to implement user separation so as to obtain carrier symbols and reference signals from the multiple first parallel groups; a removing module configured to remove inter carrier interference from the carrier symbols and the reference signals so as to form the data carrier symbols and offset-corrected reference symbols, respectively; and a channel estimation module configured to perform channel estimation on the offset-corrected reference symbols so as to form the multiple channel estimation symbols.

In one embodiment of the present invention, the instructing module comprises: a second grouping module configured to perform channel equation and multiple antennas combination with respect to the multiple data carrier symbols and the multiple channel estimation symbols so as to form multiple effective frequency-domain symbols as multiple second parallel groups; and a second processing module configured to at least partially in parallel obtain an estimated value of an original code stream from the multiple effective frequency-domain symbols as data objects used for a third stage.

In one embodiment of the present invention, the second processing module comprises: an inverse converting module configured to convert the multiple effective frequency-domain symbols into time-domain signals; and an estimation module configured to perform constellation demodulation with respect to the time-domain signals so as to obtain an estimated value of an original code stream.

In one embodiment of the present invention, the instructing module comprises: a third grouping module configured to, in a third stage of the multiple processing stages, extract multiple code blocks from the estimated value of the original code stream as multiple third parallel groups; and a third processing module configured to at least partially in parallel restore transmitted code blocks from the multiple code blocks.

In one embodiment of the present invention, the third processing module is further configured to: perform channel deinterleaving, rate dematching and hybrid repeat mode combination with respect to the multiple code blocks so as to restore transmitted code blocks.

In one embodiment of the present invention, the constructing module comprises: a decoding module configured to decode the transmitted code blocks based on a decoding algorithm; and a combining module configured to combine the decoded code blocks so as to form the transmission block (TB).

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method for parallel data processing, comprising:
receiving baseband data corresponding to multiple antennas from uplink data;
converting the baseband data from time-domain signals to frequency-domain signals;
processing the frequency-domain signals so as to restore transmitted code blocks, said processing the frequency-domain signals comprising:
identifying the frequency-domain signals as data objects; and
processing, in a stage among multiple stages, the data objects at least partially in parallel so as to generate data objects used for a next stage, based on parallel groups corresponding to the stage and comprised in the data objects, said processing the data objects comprising:
in response to having obtained multiple parallel groups corresponding to the stage, instructing one of multiple processing units to process one of the multiple parallel groups so as to generate data objects used for a next stage, said instructing comprising
in a first stage of the multiple processing stages, dividing the frequency-domain signals into multiple first parallel groups based on the multiple antennas corresponding to the frequency-domain signals; and
implementing user separation so as to obtain carrier symbols and reference signals from the multiple first parallel groups;
removing inter carrier interference from the carrier symbols and the reference signals so as to form data carrier symbols and offset-corrected reference symbols, respectively; and
performing channel estimation on the offset-corrected reference symbols so as to form the multiple channel estimation symbols from multiple first parallel groups as data objects used for a second stage; and constructing a transmission block (TB) based on the transmitted code blocks.

2. The method according to claim 1, wherein the instructing, in response to having obtained multiple parallel groups corresponding to the stage, one of the multiple processing units to process one of the multiple parallel groups so as to generate data objects used for a next stage comprises:

in the second stage of the multiple processing stages, performing channel equation and multiple antennas combination with respect to the multiple data carrier symbols and the multiple channel estimation symbols so as to form multiple effective frequency-domain symbols as multiple second parallel groups; and obtaining, at least partially in parallel, an estimated value of an original code stream from the multiple effective frequency-domain symbols as data objects used for a third stage.

3. The method according to claim 2, wherein the at least partially in parallel obtaining an estimated value of an original code stream from the multiple effective frequency-domain symbols comprises:

converting the multiple effective frequency-domain symbols into time-domain signals; and performing constellation demodulation with respect to the time-domain signals so as to obtain an estimated value of an original code stream.

4. The method according to claim 2, wherein the instructing, in response to having obtained multiple parallel groups corresponding to the stage, one of the multiple processing units to process one of the multiple parallel groups so as to generate data objects used for a next stage comprises:

in a third stage of the multiple processing stages, extracting multiple code blocks from the estimated value of the original code stream as multiple third parallel groups; and restoring, at least partially in parallel, transmitted code blocks from the multiple code blocks.

5. The method according to claim 4, wherein the at least partially in parallel restoring transmitted code blocks from the multiple code blocks comprises:

performing channel deinterleaving, rate dematching and hybrid repeat mode combination with respect to the multiple code blocks so as to restore transmitted code blocks.

6. The method according to claim 1, wherein the constructing transmission block based on the transmitted code blocks comprises:

decoding the transmitted code blocks based on a decoding algorithm; and combining the decoded code blocks so as to form the transmission block.

7. An apparatus for parallel data processing, comprising:
a memory, a processor device communicatively coupled to the memory, and multiple processing units configured for parallel data processing and coupled to said memory and said processor device, said processor device configured to:

receive baseband data corresponding to multiple antennas from uplink data;

convert the baseband data from time-domain signals to frequency-domain signals;

process the frequency-domain signals so as to restore transmitted code blocks, said processor device is further configured to:

identify the frequency-domain signals as data objects; and process, in a stage among multiple processing stages, the data objects at least partially in parallel so as to generate data objects used for a next stage, based on parallel groups corresponding to the stage and comprised in the data objects, wherein to process the data objects, said processor device is further configured to:

in response to having obtained multiple parallel groups corresponding to the stage, instruct one of the multiple processing units to process one of the multiple parallel groups so as to generate data objects used for a next stage, wherein to instruct, said processor device is further configured to:

in a first stage of the multiple processing stages, divide the frequency-domain signals into multiple first parallel groups based on the multiple antennas corresponding to the frequency-domain signals; and said processor device is further configured to:

implement user separation so as to obtain carrier symbols and reference signals from the multiple first parallel groups;

remove inter carrier interference from the carrier symbols and the reference signals so as to form data carrier symbols and offset-corrected reference symbols, respectively; and perform channel estimation on the offset-corrected reference symbols so as to form multiple channel estimation symbols from multiple first parallel groups as data objects used for a second stage; and said processor device is further configured to construct transmission block (TB) based on the transmitted code blocks.

8. The apparatus according to claim 7, wherein the processor device is further configured to:

perform channel equation and multiple antennas combination with respect to the multiple data carrier symbols and the multiple channel estimation symbols so as to form multiple effective frequency-domain symbols as multiple second parallel groups; and at least partially in parallel obtain an estimated value of an original code stream from the multiple effective frequency-domain symbols as data objects used for a third stage.

9. The apparatus according to claim 8, wherein the processor device is further configured to:

convert the multiple effective frequency-domain symbols into time-domain signals; and perform constellation demodulation with respect to the time-domain signals so as to obtain an estimated value of an original code stream.

10. The apparatus according to claim 8, wherein the processor device is further configured to:

in a third stage of the multiple processing stages, extract multiple code blocks from the estimated value of the original code stream as multiple third parallel groups; and at least partially in parallel restore transmitted code blocks from the multiple code blocks.

11. The apparatus according to claim 10, wherein said processor device is further configured to:

perform channel deinterleaving, rate dematching and hybrid repeat mode combination with respect to the multiple code blocks so as to restore transmitted code blocks.

12. The apparatus according to claim 7, wherein the processor device is further configured to:
    decode the transmitted code blocks based on a decoding algorithm; and
    combine the decoded code blocks so as to form the transmission block.

* * * * *